United States Patent [19]
Hess et al.

[11] Patent Number: 5,301,365
[45] Date of Patent: Apr. 5, 1994

[54] BIDIRECTIONAL CLOCKING APPARATUS WITH AUTOMATIC SENSING

[75] Inventors: David M. Hess, Elgin; John J. Janssen, Gurnee; Michael W. Houghton, Hoffman Estates, all of Ill.

[73] Assignee: Motorola, Inc., Schaumburg, Ill.

[21] Appl. No.: 961,959

[22] Filed: Oct. 16, 1992

[51] Int. Cl.⁵ .................. H04B 1/40; H03B 1/00; H03L 7/02
[52] U.S. Cl. .................. 455/73; 331/74; 307/271
[58] Field of Search ........... 455/73, 77, 84, 255, 455/258, 259, 260; 307/269, 271; 331/1 A, 74

[56] References Cited
U.S. PATENT DOCUMENTS 4,817,199  3/1989  Wallraff ................ 455/260
5,050,195  9/1991  Munter ................. 455/260

FOREIGN PATENT DOCUMENTS 0288633  12/1986  Japan ................. 455/73

Primary Examiner—James L. Dwyer
Assistant Examiner—Mark D. Wisler
Attorney, Agent, or Firm—Rolland R. Hackbart

[57] ABSTRACT

The bidirectional clocking apparatus provides automatic sensing of whether a reference clock being generated by another circuit needs to be divided down to a lower frequency. If this is true, the clock is divided down to a lower frequency and sent out to other circuits requiring the lower frequency clock. If the lower frequency clock is already generated from another circuit, the apparatus accepts this clock for use by other circuits. Only one terminal is required for either sourcing or accepting this lower frequency clock signal.

5 Claims, 3 Drawing Sheets

BIDIRECTIONAL CLOCKING APPARATUS WITH AUTOMATIC SENSING

FIELD OF THE INVENTION

The present invention relates generally to the field of electronic circuit clocking.

BACKGROUND OF THE INVENTION

A microprocessor typically requires an external clock to operate. This clock can be sourced by a reference oscillator that may have a higher frequency that is divided down to a lower frequency for use by the microprocessor or other circuitry requiring a clock.

To reduce manufacturing costs, different models of an electronic device can share the same printed circuit board with only certain components being changed. The different components may require different clock frequencies for proper operation. The different models may also require the clock in different parts of the circuit. These changes would require changing the reference oscillator clock circuit and the board layout each time a different clock is needed. There is a resulting need for an apparatus that automatically senses the clock and directs a modified clock output to the appropriate location depending on the clock's frequency and source.

SUMMARY OF THE INVENTION

The apparatus of the present invention encompasses a bidirectional clocking apparatus for sourcing and receiving, at different times, a clocking signal on a single input/output terminal. The apparatus is comprised of a dock input coupled to a reference clocking signal. Means for counting pulses of the reference clocking signal is coupled to the clock input. The means for counting has an overflow output to indicate a count overflow. A reset input is coupled to a first reset signal that can be in either a logical high state or a logical low state. Means for generating the first clocking signal from the reference clocking signal is coupled to the clock input. The means for generating has an output enable that controls an output that is coupled to the input/output terminal. Means for generating a second reset signal is coupled to means for generating an enable signal. The enable signal is generated in response to the overflow output, the state of the first reset signal, and the state of the second reset signal. The means for generating the enable signal is coupled to the output enable to control the output of the means for generating the clocking signal

DETAILED DESCRIPTION OF THE PREFERRED EMBODIMENT

The bidirectional clocking apparatus of the present invention enables a single clock circuit to be used for multiple applications where the clock source varies. The apparatus senses the reference clock source and frequency and automatically directs a modified clock output to the appropriate circuit. This is accomplished using only one bidirectional terminals of an integrated circuit.

Figure 1:
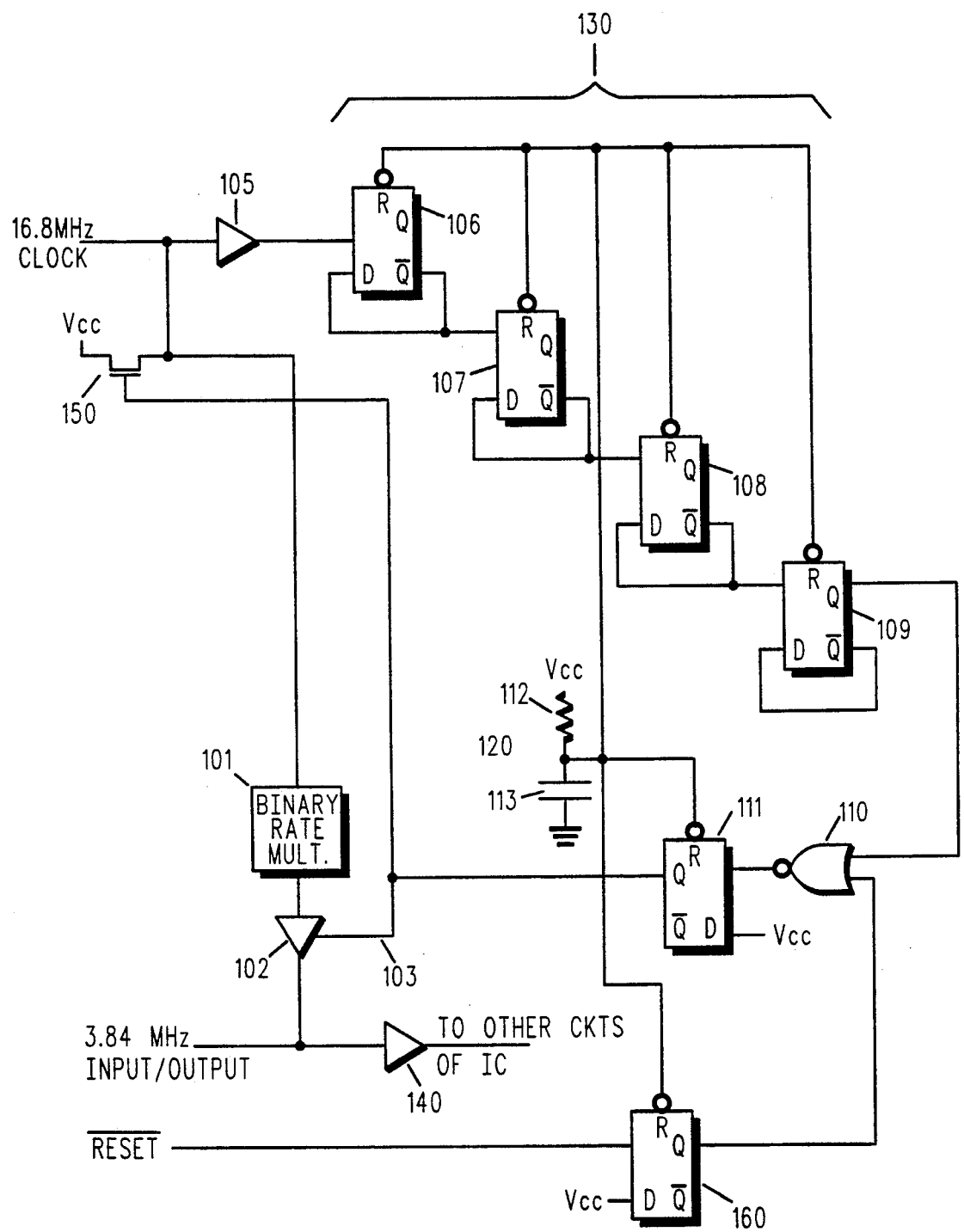
FIG. 1 shows a schematic of the apparatus of the present invention.

The bidirectional clocking apparatus is illustrated in FIG. 1. In the preferred embodiment, a reference oscillator generates a clock at a frequency of 16.8 MHz. Also in the preferred embodiment, a microprocessor and other circuits require a 3.84 MHz clock. The 16.8 MHz clock is divided down to the 3.84 MHz frequency by a binary rate multiplier (101). The binary rate multiplier is well known in the art as a circuit that divides a frequency to an uneven multiple of the input.

The output of the binary rate multiplier is connected to a gate (102) having a high impedance capability at the output. This high impedance state is controlled by a control input (103). A logical high on the control input allows the signal on the input of the gate (102) to reach the output. A logical low on the control input changes the output of the gate (102) to a high impedance.

An active pull-up device (150) with an effective impedance of 10 k$\Omega$ at the 16.8 MHz clock input is used to reduce the effects of noise on the clock signal. The 16.8 MHz dock is also input to a Schmitt trigger buffer (105) to better define the edges of the clock signal and to increase its noise immunity. The 16.8 MHz signal at the output of the buffer (105) is connected to the clock input of the first stage (106) of a four bit counter. In the preferred embodiment, the counter (130) is made up of four D flip-flops (106–109) that are connected such that the prior stage's non-inverting output is connected to the next stage's clock input.

The non-inverting output of the final stage (109) of the counter (130) is connected to one of the inputs of a two input NOR gate (110). The other input of the NOR gate (110) is connected, through a D flip-flop that allows only one reset pulse through, to a $\overline{\text{RESET}}$ signal that is generated from another circuit. This signal is used by other parts of an electronic device that uses the bidirectional clocking apparatus of the present invention. The $\overline{\text{RESET}}$ signal is active low when power is applied to the circuit of the present invention and eventually reaches a logical high state after approximately 500 milliseconds in the preferred embodiment.

The output of the NOR gate (110) is connected to the clock input of a D flip-flop (111) that is used as a control latch. The D input of this flip-flop (111) is tied to $V_{cc}$. This has the effect of clocking a logical high to the non-inverting output when the signal at the clock input goes to a logical low. The output of this flip-flop (111) is the control input (103) to the three state gate.

A reset circuit (120), comprised of a resistor (112) in series with a capacitor (113), generates a pre-reset signal that is connected to the reset inputs of each stage (106–109) of the counter (130) and the reset input of the control latch (111). The resistor (112) is tied to $V_{cc}$ and the capacitor is tied to ground. In the preferred embodiment, the resistor and capacitor are chosen such that the combination generates a pre-reset signal that is low for approximately 1 ms after power is applied to the circuit, thus resetting the components to which this pre-reset signal is connected for the time that this signal is low.

The pre-reset signal, therefore, goes to a high state 499 ms before the $\overline{\text{RESET}}$ signal reaches the high state. This creates a window of 499 ms in which the control latch may be clocked. Once the $\overline{\text{RESET}}$ signal goes high, the output of the NOR gate (110) will always be a logic low.

The output of the three state gate is connected to an input/output terminal of the apparatus of the present invention. This terminal is also connected to the input of another buffer (140) that leads to other circuits.

When power is applied to the apparatus of the present invention, the pre-reset signal from the reset circuit (120) causes the outputs of the counter (130) and the control latch (111) to go low. The 16.8 MHz clock has no effect on the counter while the pre-reset signal is low. When the pre-reset signal goes high, the counter (130) starts counting. When the counter (130) reaches 16, the output of the last stage (109) goes low thus causing the output of the NOR gate to go high. This clocks a logical high into the control latch (111). This high control signal (103) enables the three state buffer, allowing the 3.84 MHz signal to reach the input/output terminal as well as the buffer (140) that leads to other circuits. This also disables the pull-up device (150) to reduce current drain.

If the 16.8 MHz clock is not present at the counter, the control signal (103) stays in the low state malting the output of the three state buffer (102) a high impedance. This allows a 3.84 MHz clock that is generated independent of the bidirectional clocking apparatus of the present invention to be input at the input/output terminal and conducted to other circuits by the buffer (140).

It can be seen from the above description that if the electronic device using the bidirectional clocking apparatus of the present invention is generating a 16.8 MHz clock of its own that must be divided down, the apparatus of the present invention senses this and generates a 3.84 MHz clock at the input/output terminal. This clock is then used by other circuits that are connected to the input/output terminal as well as circuits connected to the buffer (140). If the electronic device does not have a 16.8 MHz clock but instead is generating its own 3.84 MHz clock, the apparatus of the present invention senses this and allows the clock to be input at the input/output terminal for use by other circuits connected to the buffer (140).

In the preferred embodiment, the bidirectional clocking apparatus of the present invention is constructed in a custom integrated circuit. This makes the one terminal input/output feature even more desirable in that it only uses one pin of the integrated circuit to provide either a clock output or to accept a clock input, depending on the situation. The apparatus of the present invention, therefore, allows more pins of the integrated circuit to be used for other uses.

Figure 2:
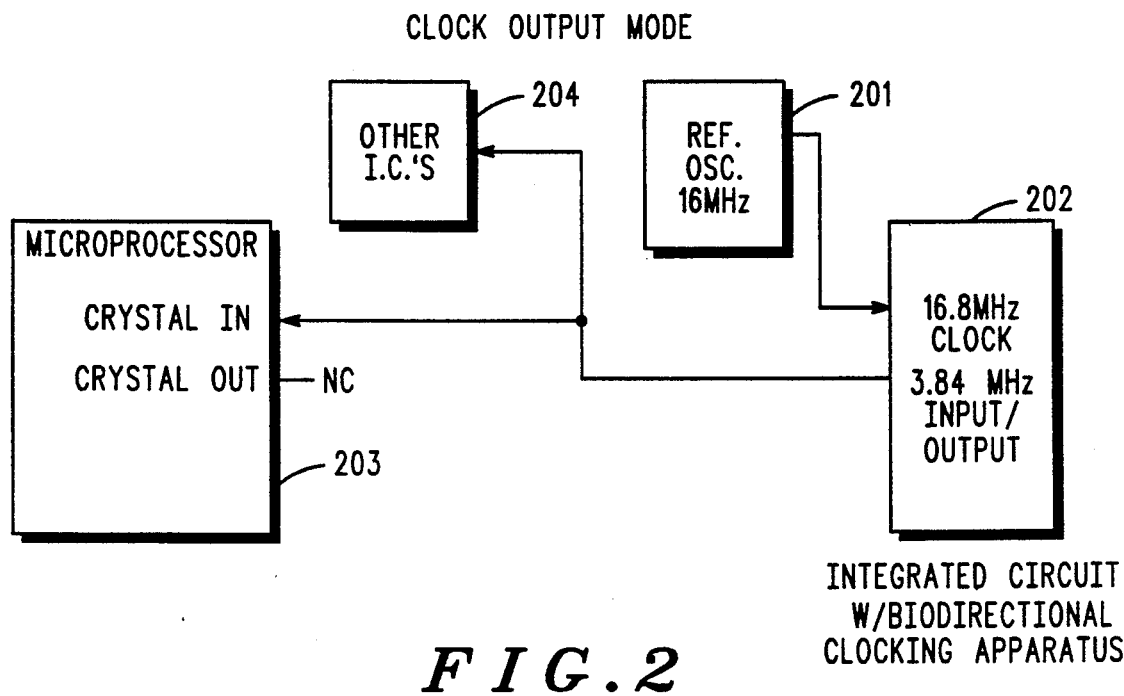
FIG. 2 shows a first block diagram of a microprocessor circuit using the bidirectional clocking apparatus of the present invention.
Figure 3:
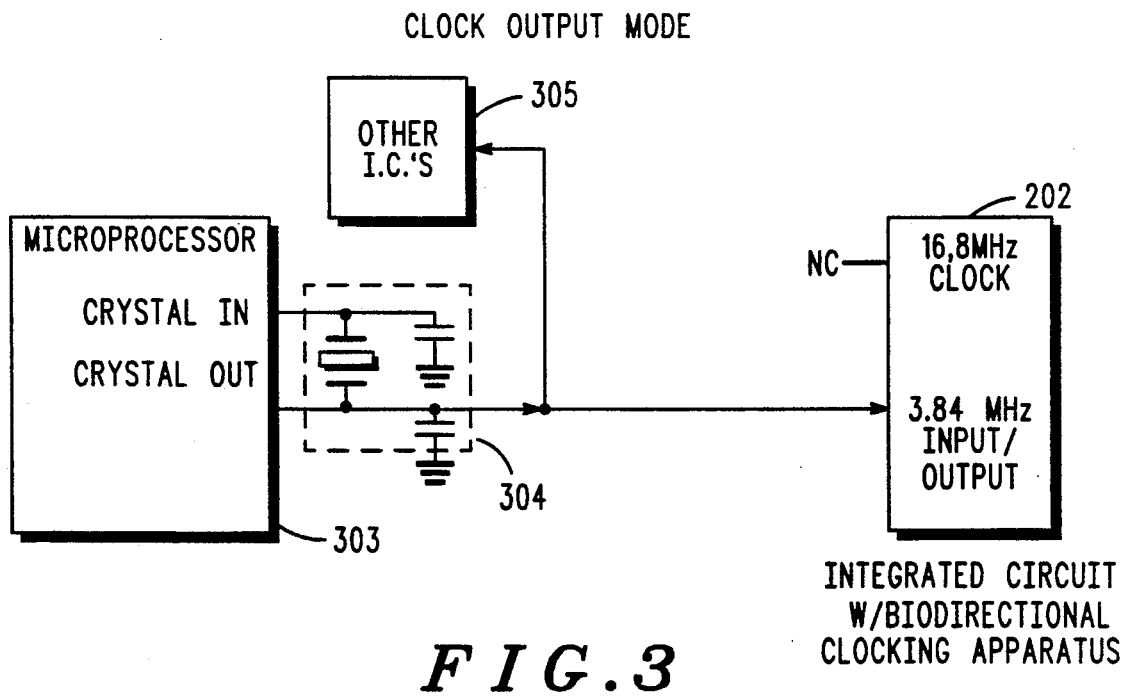
FIG. 3 shows a second block diagram of a microprocessor circuit using the bidirectional clocking apparatus of the present invention.

The bidirectional clocking apparatus of the present invention is illustrated in FIGS. 2 and 3 in conjunction with external circuitry. FIG. 2 shows the apparatus of the present invention in a clock output mode. The reference oscillator (201) inputs the clock signal to the integrated circuit (202) having the apparatus of the present invention. The integrated circuit (202), through the bidirectional clock pin, outputs the divided down clock to the clock input of the microprocessor (203) and other circuitry (204) needing the reduced frequency dock. The integrated circuit (202) may also contain additional circuitry that requires the divided down clock. This is accomplished by routing the clock internally.

FIG. 3 illustrates a clock input mode of the apparatus of the present invention. The clock that is input to the bidirectional clock pin of the integrated circuit (202) having the apparatus of the present invention is generated by the microprocessor's (303) crystal circuitry (304). This clock is used by the additional circuitry in the integrated circuit (202) as well as other circuitry (305) external to the integrated circuit.

Figure 4:
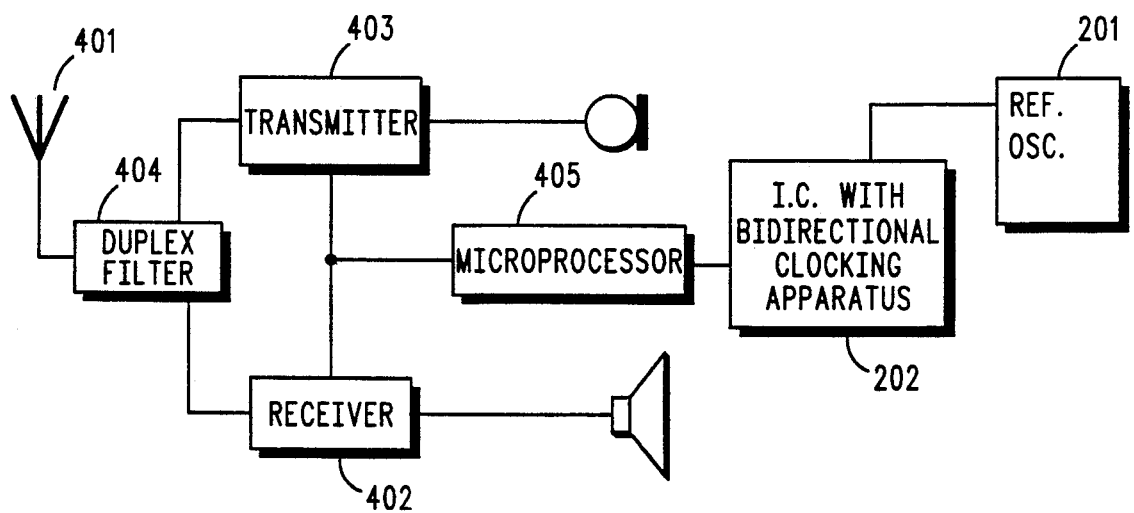
FIG. 4 shows a block diagram of a radiotelephone in accordance with the present invention.

While the bidirectional docking apparatus of the present invention can be used in any circuit, the apparatus of the present invention is used in a radiotelephone in the preferred embodiment. A simple block diagram of such a device is illustrated in FIG. 4. The radiotelephone is comprised of an antenna (401) coupled to a receiver (402) and transmitter (403) through a duplex filter (404). The radiotelephone is controlled by the microprocessor (405) that is coupled to the integrated circuit (202) containing the apparatus of the present invention. The reference oscillator (201) inputs the clock signal to the integrated circuit (202).

The above description uses 16.8 MHz and 3.84 MHz as clock frequencies. Alternate embodiments may use other frequencies depending on the application. The binary rate multiplier may also divide the input clock frequency to another required frequency.

We claim:

1. A bidirectional clocking apparatus for sourcing at a first time and receiving at a second time a first clocking signal on an input/output terminal, the apparatus comprising:

a clock input for receiving a second clocking signal during the first time;

means for counting pulses of the second clocking signal, the means having an overflow output;

a reset input for receiving a first reset signal having a logical high state and a logical low state;

means for generating the first clocking signal from the second clocking signal, the means for generating having an output enable and an output coupled to the input/output terminal;

means for generating a second reset signal having a logical high state and a logical low state; and means for generating an enable signal in response to the overflow output, the state of the first reset signal, and the state of the second reset signal, the means for generating being coupled to the output enable.

2. The apparatus of claim 1 wherein the means for generating the first clocking signal is a binary rate multiplier that multiples a frequency of the second clocking signal down to a frequency of the first clocking signal.

3. The apparatus of claim 1 wherein the means for generating the second reset signal is a series connection of a resistor and a capacitor, the resistor also coupled to a predetermined voltage and the capacitor also coupled to ground potential.

4. A radiotelephone comprising:

means for receiving radiotelephone signals;

means for transmitting radiotelephone signals;

processing means for controlling the radiotelephone;

reference oscillator means for generating an oscillator signal; and

A bidirectional clocking apparatus for sourcing at a first time and receiving at a second time a clocking signal on an input/output terminal, the apparatus comprising:

a clock input for receiving the oscillator signal during the first time;

means for counting pulses o the oscillator signal, the means having an overflow output;

a reset input for receiving a first reset signal having a logical high state and a logical low state;

means for generating the clocking signal from the oscillator signal, the means for generating having an output enable and an output coupled to the input/output terminal;

means for generating a second reset signal having a logical high state and a logical low state; and means for generating an enable signal in response to the overflow output, the state of the first reset signal, and the state of the second reset signal, the means for generating being coupled to the output enable.

5. A bidirectional clocking apparatus for sourcing at a first time and receiving at a second time a first clock signal on an input/output terminal, the apparatus comprising:

a clock input for receiving an external clock signal during the first time;

a sequence of flip flops comprising a first flip flop, a second flip flop, a third flip flop, and a fourth flip flop, the sequence of flip flops coupled such that inputs of the second, third, and fourth flip flops are coupled respectively to outputs of the first, second, and third flip flops, the first flip flop input for receiving the external clock and the fourth flip flop having an overflow output;

a reset input for receiving a first reset signal having a logical high state and a logical low state;

multiplying means, coupled to the lock input, for decreasing the external clock signal frequency to the first clock signal frequency;

gating means coupled to the multiplying means, the gating means having an output, coupled to the input/output terminal, and an output enable;

means for generating a second reset signal having a logical high state and a logical low state, the second reset signal reaching the logical high state before the first reset signal reaches the logical high state;

means for logically combining having a first input coupled to the overflow output, a second input for receiving the first reset signal, and an output; and means for generating an output enable signal in response to the second reset signal and the output of the means for logically combining, the means for generating being coupled to the output enable of the gating means.

* * * * *